Feb. 7, 1939.   J. P. BROWN ET AL   2,146,620
GYROSCOPIC APPARATUS
Filed Dec. 21, 1936   3 Sheets-Sheet 1
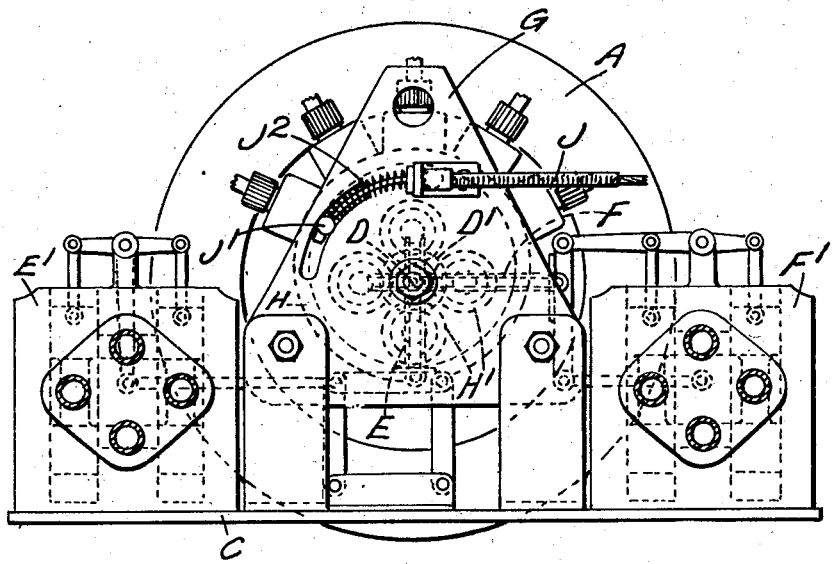
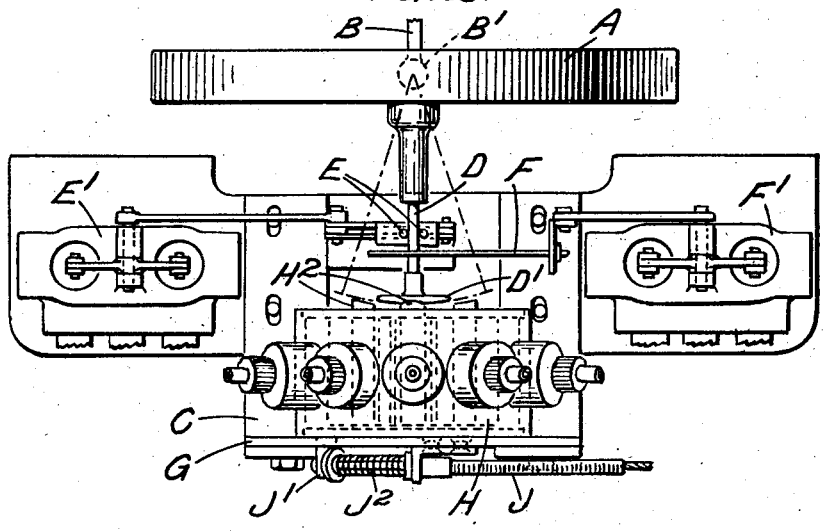
Inventors.
J. P. BROWN.
F. D. ALDRIDGE.

Feb. 7, 1939. J. P. BROWN ET AL 2,146,620
GYROSCOPIC APPARATUS
Filed Dec. 21, 1936   3 Sheets-Sheet 2
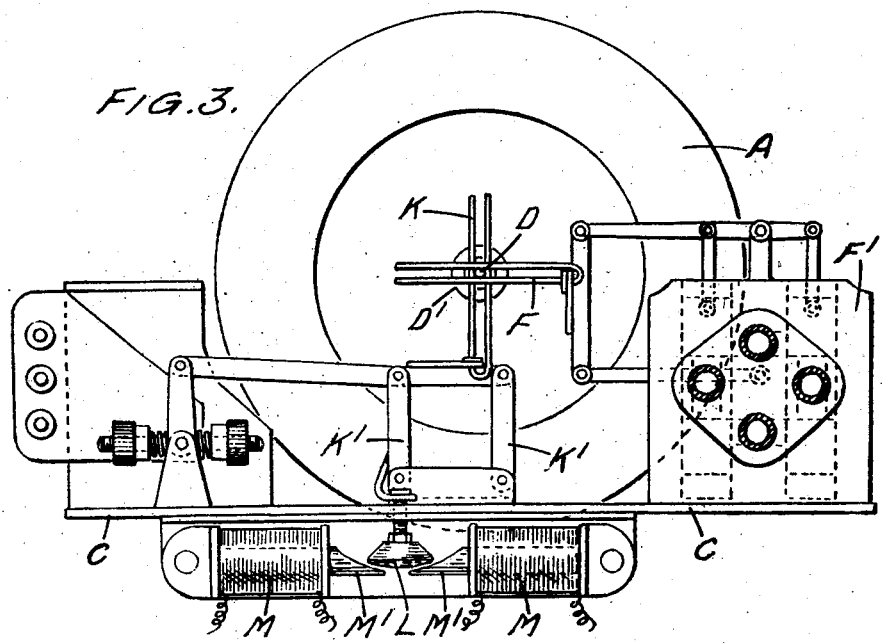
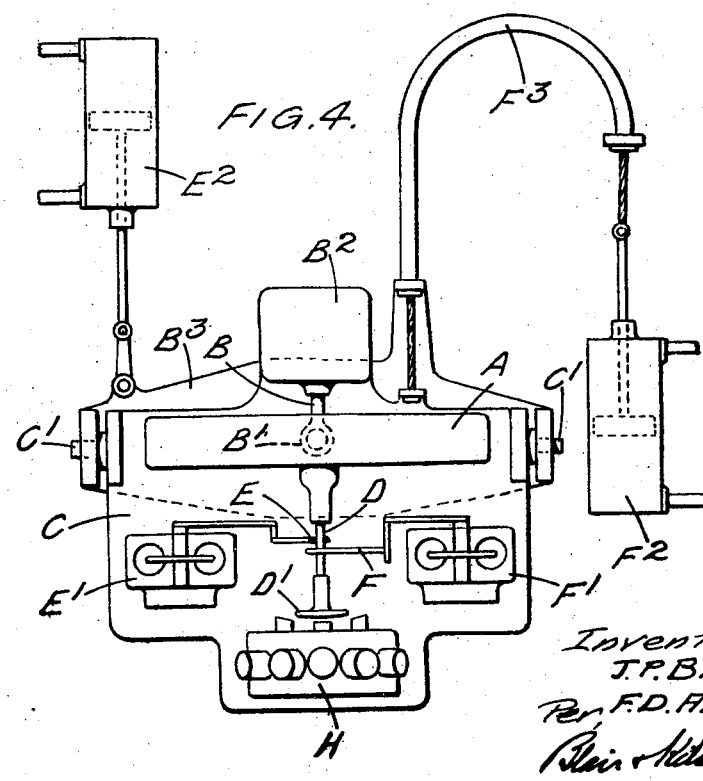
Inventors
J. P. Brown
F. D. Aldridge Patented Feb. 7, 1939

2,146,620

UNITED STATES PATENT OFFICE 2,146,620

GYROSCOPIC APPARATUS

John Pollock Brown, Croydon, and Frank Dudley Aldridge, London, England, assignors to P. B. Deviator Limited, London, England, a company of Great Britain Application December 21, 1936, Serial No. 117,078
In Great Britain January 1, 1936

10 Claims. (Cl. 244—79)

This invention relates to apparatus for adjusting the orientation of a gyroscope and is more particularly applicable, although not limited, to automatic navigating apparatus, for example, of the kind described in prior United States of America Patent No. 2,036,914. That patent describes apparatus in which the gyro rotor is mounted upon its driving spindle by means of a ball joint and the drive takes place by friction between the two halves of the ball joint with a considerable amount of slipping. The rotor controls servo means about each of two transverse axes at right angles to one another, referred to herein as control axes. The servo means operates not only to bring the spindle into line with the rotor axis but also to operate navigating controls to keep an aircraft on a desired course and in a desired attitude. Thus, in the ordinary way the orientation of the gyro rotor remains unaltered and the aircraft continues to fly in a constant direction and attitude. It is, however, in many cases desirable to be able to adjust or alter the course of the craft either manually at will or in response to some over-riding control such as a compass, a wireless beam or a photo-electric device. One object of the present invention is to provide improved means for achieving this purpose.

According to the present invention apparatus for adjusting the orientation of a gyroscope of the type in which the rotor is mounted by means of a ball joint on a driving spindle and is driven by friction through the joint, comprises a member carried by the rotor at a point on its axis, and an electromagnetic device for exerting a lateral force on the said member to cause precession of the rotor.

The invention is illustrated by way of example in the accompanying drawings, in which—

Figure 5:
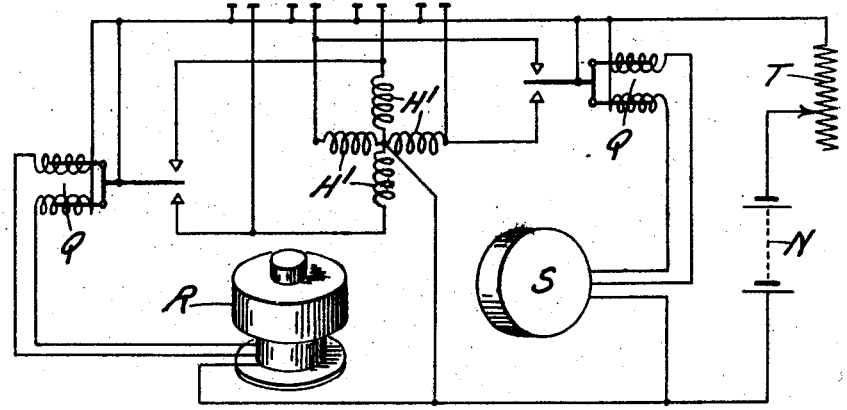
Figure 6:
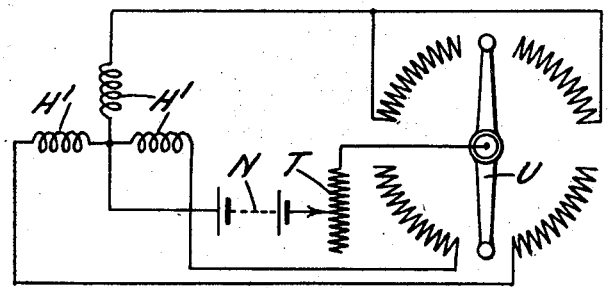
Figure 7:
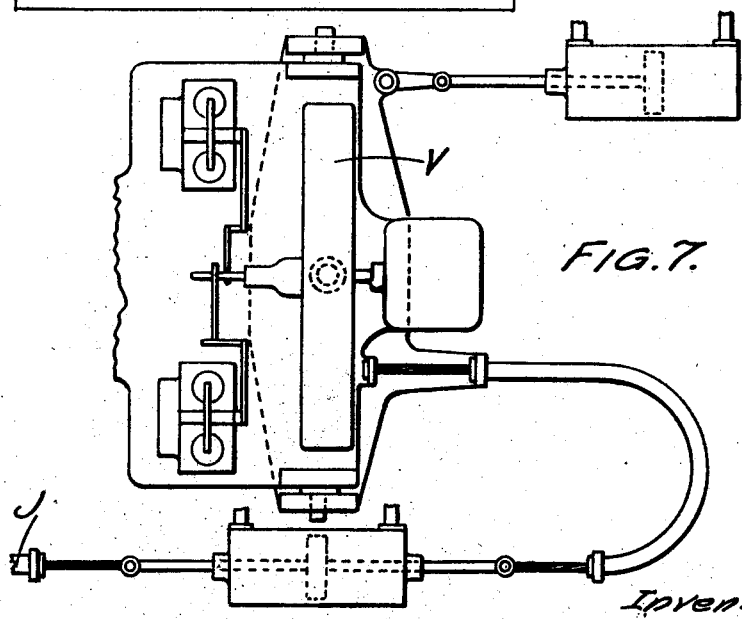

Figure 1 is an elevation of a portion of an automatic navigating apparatus embodying the invention, for controlling the rudder and elevators of an aircraft, Figure 2 is a plan of the apparatus shown in Figure 1, Figure 3 is a view similar to Figure 1 of an apparatus for controlling the ailerons of an aircraft, Figure 4 is a diagram indicating the relationship of the parts shown in Figures 1 and 2 to the servo means, Figure 5 is a circuit diagram of the apparatus, Figure 6 is a circuit diagram of a modified arrangement, and Figure 7 is a diagrammatic plan view of an auxiliary gyroscope for controlling the apparatus shown in Figures 1, 2 and 4.

The invention is shown in the drawings as applied to apparatus generally as described in the prior specification referred to above. Thus, as indicated in the diagram of Figure 4, the apparatus comprises a gyro rotor A mounted on a driving spindle B by means of a ball joint $B^1$ which allows the rotor to turn about any axis relatively to the spindle, the drive being effected by friction between the ball joint surfaces and considerable slip occurring so as to ensure freedom of movement about transverse axes. The spindle B is driven by a motor $B^2$ which may, for example, be in the form of a turbine and the motor is carried by a platform C universally mounted to pivot about horizontal trunnions $C^1$ in a cradle $B^3$ which latter is pivoted about a vertical axis. The horizontal and vertical axes about which the platform C moves intersect at the centre of the ball joint $B^1$.

Projecting coaxially from the rotor away from the spindle is a pin D which extends between the limbs of a vertical fork member E, the lateral movement of which controls valves $E^1$ which operate a servo motor $E^2$. The servo motor $E^2$ serves to turn the cradle $B^3$ about a vertical axis so as to follow-up the apparent movements of the rotor and at the same time is connected to operate rudder controls of the aircraft in which the apparatus is fitted. Similarly a horizontal fork member F controls valves $F^1$ operating a servo motor $F^2$ which produces a follow-up movement of the platform C about the horizontal trunnions $C^1$ for example by means of a flexible push and pull connector $F^3$.

The apparatus so far described is substantially in accordance with the prior patent referred to above and is described in greater detail therein.

In applying the present invention, the pin D projecting coaxially from the rotor is provided at its end with an armature $D^1$ in the form of a disc of soft iron having a spherical end face struck about the centre of a ball joint. Adjacent the armature is a bracket or plate G mounted on the platform C and carrying an electromagnetic device H. The electromagnetic device comprises four solenoids $H^1$ mounted parallel to one another at the corners of a square having its sides inclined to the vertical at 45°. The pole pieces $H^2$ of the solenoids are presented to the spherical surface of the armature and spaced radially from it by a suitable air gap, and when the rotor is in line with its driving spindle they are equally spaced from the axis of the armature and lie just outside the periphery thereof.

As shown in Figure 5 solenoids are connected up through suitable controlling contacts to a source of current N. For example, the controlling contacts may be operated by knobs or press buttons P under the control of the pilot of the aircraft. The pilot will then press one button to go to the right, another to go to the left, another to put the nose up and another to put the nose down. In each case whichever solenoid is energized pulls the armature in a direction towards it and produces a precession in a direction at right angles thereto. Thus if the right hand solenoid is energized the disc will move up or down according to the direction of rotation of the gyro rotor.

In either arrangement means is preferably provided for adjusting the electromagnetic device about the axis of the driving spindle. Thus if in order to move the disc vertically upwards a solenoid is energized which is accurately horizontally spaced from the axis of the gyro, it may be that, owing to frictional and other effects, trouble which may be described as cross worry may arise. That is to say the desired movement of the rotor about one axis may produce a couple about that axis and cause precession about a transverse axis, about which no movement is desired. As a result in the case contemplated the armature would not move precisely vertically. By turning the electromagnetic device so that the pull exerted by the solenoid is slightly inclined to the horizontal it is possible to obtain a truly vertical movement of the armature.

Thus Figures 1 and 2 show the electromagnetic device H as connected to the plate G by means of a central pivot and means for turning it about this pivot. The latter is shown diagrammatically as comprising a Bowden wire J having its casing connected to the plate G and its wire connected to a stud $J^1$ secured to the electromagnetic device and projecting through a slot $J^2$ in the plate G.

Figure 3 shows an arrangement which may conveniently be employed where the particular gyro in question is only called upon to control the aircraft about one axis. For example if the apparatus shown in Figures 1 and 2 is used to control the rudder and elevators and for this purpose has its axis in a fore and aft direction, the apparatus shown in Figure 3 might be employed to control the ailerons and for this purpose would have its axis extending athwart the craft.

In general the apparatus shown in Figure 3 is similar to that shown in Figures 1 and 2 and like reference letters are employed for like parts. Thus the pin D extending from the rotor is embraced by a horizontal fork F serving to control servo valves $F^1$ which in turn control a servo motor serving to operate the ailerons and also produce a follow-up movement of the gyro spindle about a horizontal axis.

Since the rudder of the aircraft is controlled by the apparatus shown in Figures 1 and 2, no further control about a vertical axis is required. Thus a vertical fork K can be employed merely for producing precession of the gyro with a view to correcting the position of the craft about a fore and aft axis.

Conveniently the fork K is mounted on a parallel linkage $K^1$ similar to that which carries the fork E in Figures 1 and 2 and is described in the prior specification referred to, and one vertical arm of the linkage is extended downwardly and carries an armature L with a spherical or cylindrical lower face. This armature co-operates with a pair of solenoids M having pole pieces $M^1$ formed to correspond to the shape of the armature. These are connected in circuit with suitable contacts for manual operation.

Instead of or in addition to controlling the device manually, means such as relays Q may be provided for employing it in conjunction with an over-riding control for example by means of known wireless beam controlling apparatus or by means of a compass R or a pressure-operated height-sensitive device S.

The rate of turning may be varied by varying the strength of the magnetic field as by rheostats T in circuit with the solenoids. Where a plurality of solenoids are employed their respective rheostats may be mechanically interconnected or their circuits electrically interconnected in accordance with requirements. For example, instead of making the electromagnetic device adjustable about the axis of the driving spindle to allow for cross worry, the circuit may be connected so that the energization of each solenoid will be accompanied by slight corrective energization of another solenoid. Thus Figure 6 shows a combined rheostat U for simultaneously precessing to the right or left and upwards so that when the rheostat is adjusted to correspond to the angle of bank of the curve a turn in the appropriate direction will be made in a horizontal plane. Again, the circuit may be connected so as automatically to apply the correct degree of banking or elevator when making a turn by precessing the gyro in azimuth.

Whilst the device has been described more particularly with reference to an automatic navigating apparatus controlling the rudder and elevator it will be appreciated that it may be used for control about one axis only or for control about any two axes for example to control the elevators and ailerons.

Again the turning of the electromagnetic device about the rotor axis may be controlled by a separate gyroscopic device. For example, operation of the Bowden wire J to turn the electromagnetic device H controlling the elevators and rudder may be controlled, as indicated in Figure 7, by a gyroscopic device V similar to that shown in Figure 4 but sensitive to roll, so that if a turn is made when not banked the rudder alone will be operated whereas when banked an appropriate amount of both rudder and elevator will be applied.

It will also be appreciated that the invention is not limited to the specific features described by way of example as various modifications may be made without departing from the invention.

What we claim as our invention and desire to secure by Letters Patent is:

1. Apparatus for adjusting the orientation of a gyroscope of the type comprising a driving spindle, a rotor and a ball joint by means of which the rotor is mounted on the driving spindle so as to be driven by friction through the joint, comprising an armature carried by the rotor at a point on its axis and an electromagnetic device including a solenoid arranged to produce a magnetic field in the neighbourhood of the armature and mounted so that it can be moved to shift the magnetic field so as to cause precession of the rotor.

2. Apparatus for adjusting the orientation of a gyroscope of the type comprising a driving spindle, a rotor and a ball joint by means of which the rotor is mounted on the driving spindle so as to be driven by friction through the joint, comprising an armature carried by the rotor at a point on its axis, an electromagnetic device for producing a magnetic field in the neighbourhood of the armature and for shifting the distribution of such field so as to cause precession of the rotor, and means for adjusting the electromagnetic device so as to progressively adjust the direction in which the field can be shifted and hence the direction in which precession will take place.

3. Apparatus for adjusting the orientation of a gyroscope of the type comprising a driving spindle, a rotor and a ball joint by means of which the rotor is mounted on the driving spindle so as to be driven by friction through the joint, comprising an armature carried by the rotor at a point on its axis, an electromagnetic device including a plurality of solenoids for producing a magnetic field in the neighbourhood of the armature and for shifting the distribution of such field, and means for moving said solenoids about the rotor axis so as to adjust the direction in which the field is shifted and hence the direction in which precession will take place.

4. Apparatus for adjusting the orientation of a gyroscope of the type having a driving spindle, a rotor and a ball joint by which the rotor is mounted on the spindle so as to be driven by friction through the joint, servo means controlled by movement of the rotor and serving to produce a follow-up movement of the spindle about each of two axes transverse to that of the rotor and at right angles to one another, referred to herein as control axes, comprising an armature in the form of a circular element coaxial and rotating with the rotor and having a spherical face concentric with the centre of freedom thereof, an electromagnetic device spaced radially from the armature, means for shifting the field produced by the device circumferentially about each of two axes transverse to the rotor axis, and means for adjusting the mounting of the electromagnetic device so as to vary the inclination to the control axes of the axes about which the field is shifted.

5. Apparatus for adjusting the orientation of a gyroscope serving for the automatic control of an aircraft, including a device which can be operated to cause a torque to be applied to the gyro rotor to produce precession thereof about a given axis, and a device serving to determine and progressively adjust the said axis about which the precession is produced.

6. Apparatus for adjusting the orientation of a gyroscope serving for the automatic control of an aircraft, including a device which can be operated to cause a torque to be applied to the gyro rotor to produce precession thereof about a predetermined axis, a device for determining and progressively adjusting the said axis about which the precession is produced, and a gyroscopic device connected to the latter to control it in accordance with the attitude of the craft.

7. The combination with automatic navigating apparatus for controlling an aircraft in azimuth and in pitch in relation to a floating part of the apparatus adapted to maintain a constant orientation in space, of means for adjusting the said floating part about a predetermined axis, and means including a gyroscope sensitive to roll for determining and progressively adjusting the said axis to retain it vertical.

8. Apparatus for adjusting the orientation of a gyroscope of the type having a rotor mounted by means of a ball joint on a driving spindle, and servo means controlled by movement of the rotor and serving to impart a follow-up movement to the spindle about each of two mutually perpendicular axes both transverse to that of the rotor, referred to herein as control axes, comprising a member carried by the rotor at a point on its axis, and an electromagnetically operated device for exerting a lateral force on said member to cause precession of the rotor, the said device being mounted so as to partake of the follow-up movement as the rotor is precessed, and means for progressively varying the direction in which the said lateral force is exerted to vary the proportion of the components of precession about the two control axes.

9. Apparatus for adjusting the orientation of a gyroscope serving for the automatic control of an aircraft about two mutually perpendicular axes, including a device which can be operated to cause a torque to be applied to the gyro rotor to produce precession thereof about either of two mutually perpendicular predetermined axes, and a device serving to determine the said predetermined axes and adjust both simultaneously so that they remain perpendicular to one another.

10. Apparatus for adjusting the orientation of a gyroscope of the type having a rotor mounted by means of a ball joint on a driving spindle, and servo means controlled by movement of the rotor and serving to produce a follow-up movement of the spindle about each of two mutually perpendicular axes both transverse to that of the rotor, referred to herein as control axes, comprising an armature in the form of a disc carried coaxially by the rotor and having a spherical face concentric with the centre of freedom thereof, an electromagnetic device spaced radially from the armature and cooperating with it to cause precession of the rotor about either of two axes transverse to the rotor axis, and means for adjusting the mounting of the electromagnetic device so as to vary progressively the inclination to the control axes of the axes about which the precession occurs.

JOHN POLLOCK BROWN.
FRANK DUDLEY ALDRIDGE.